United States Patent [19]

Roscoe et al.

[11] 3,957,330

[45] May 18, 1976

[54] ELECTRICAL CONNECTIONS

[75] Inventors: Colin Roscoe, Mold, Wales; Kevin Lucas, Widnes, England

[73] Assignee: The Electricity Council, London, England

[22] Filed: Mar. 27, 1975

[21] Appl. No.: 562,727

[30] Foreign Application Priority Data
Mar. 27, 1974 United Kingdom............... 13598/74

[52] U.S. Cl. ........................... 339/5 L; 339/118 R
[51] Int. Cl.². ....................................... H01R 39/00
[58] Field of Search................ 339/5 L, 5 R, 22 B, 339/30, 34, 35, 113 R, 117 R, 118 R

[56] References Cited
UNITED STATES PATENTS
3,021,496   2/1962   Kenyon .............................. 339/5 L FOREIGN PATENTS OR APPLICATIONS
857,678   1/1961   United Kingdom ................. 339/5 L

*Primary Examiner*—Roy Lake
*Assistant Examiner*—DeWalden W. Jones
*Attorney, Agent, or Firm*—Beveridge, DeGrandi, Kline & Lunsford

[57] ABSTRACT

An electrical connection for coupling large currents (of the order of 30,000 Amps) to a rotating shaft (such as the support spindle of a drum cathode in an electrodeposition apparatus) with lower power loss as compared with conventional brush techniques. A conductive stationary member encircles an outer conductive sleeve which is locked via a taper split inner conductive sleeve to the shaft. The inner surface of the stationary member has an annular recess which forms an annular chamber. Conductive liquid fed from a reservoir mounted on the stationary member fills the chamber and electrically connects the stationary member to the outer sleeve which is electrically connected to the shaft via the inner sleeve. The stationary member has means for connection to a supply of electrical current. Sealing means are provided to prevent leakage of conductive liquid, and, where the conductive liquid requires to be maintained at an elevated temperature, the stationary member can be heated and maintained at a preselected temperature by means of heating means responsive to the output of a temperature sensor arranged adjacent the annular chamber.

14 Claims, 2 Drawing Figures

ELECTRICAL CONNECTIONS

BACKGROUND OF THE INVENTION

This invention relates to electrical connections, and in particular an electrical connection between a rotatable member and a stationary member.

SUMMARY

According to this invention there is provided an electrical connection between a rotatable member having at least a portion thereof formed with a cylindrical surface, and a conductive stationary member having a surface complementary to at least a portion of said cylindrical surface and being arranged adjacent thereto, at least one of said complementary surface and said cylindrical surface having a recess therein such as to form a space between the stationary and rotatable members, the connection including a conductive liquid contained in the space, and sealing means arranged to prevent leakage of conductive liquid from the space, and wherein the stationary member has connector means for enabling an electrical connection to be made thereto.

Preferably the stationary member is arranged such that its complementary surface encircles the cylindrical surface of the rotatable member. For a given axial length of recess, this provides a maximum possible area of contact between the conductive liquid and the cylindrical surface.

The space is preferably completely filled with the conductive liquid, and for this purpose the stationary member may include reservoir means communicating with the space.

Preferably the space is formed solely by a recess in the complementary surface. This permits the electrical connection to be disposed at any convenient axial position along the cylindrical surface of the rotatable member.

The conductive liquid may be mercury, alternatively, it may be a suitable conductive mixture obtained by combining in an appropriate known combination two or more of the following elements: tin, lead, bismuth, cadmium, tellurium, indium, arsenic, gallium, and zinc. A preferred conductive mixture is 31.25% lead, 18.75% tin and 50% bismuth, percentages being by weight.

The rotatable member may be in the form of a composite structure comprising an inner portion, conveniently in the form of a cylindrical shaft, an annular outer portion spaced from the inner portion, having a taper internal surface and being locked to the inner portion by means of an arrangement including a split taper sleeve disposed between the inner and outer portions. It will be apparent that the external surface of the outer portion of the rotatable member constitutes the said cylindrical surface.

Where a conductive liquid is used having a melting point higher than ambient temperatures, it will be necessary to provide heating means for supplying heat to the conductive liquid so that it stays in its liquid state. The heating means may comprise a plurality of electrical heating elements mounted in aperture means in the form of apertures or pockets regularly distributed around the stationary member. Preferably, the conductive liquid is maintained at or near a preselected temperature, and for this purpose the supply for the electrical heating elements may be arranged to be responsive to the output of a temperature sensing means arranged such that the sensing point of the temperature sensing means is adjacent the space containing the conductive liquid.

In one arrangement of an electrical connection the sealing means may be in the form of resilient sealing members sandwiched between the stationary member and the rotatable member, preferably being disposed within grooves in the complementary surface of the stationary member. In a preferred arrangement of an electrical connection, the stationary member has flat end faces and the sealing means is in the form of an annular sealing member for each of the end faces, each sealing member being arranged to seal against its associated end face and also to the cylindrical surface of the rotatable member. Preferably at least one of the seals against the associated end face and against the rotatable member includes an O-ring disposed in a corresponding groove in the annular sealing member. For effecting the seal against the end faces of the stationary member means will be provided for urging the sealing members in an axial direction. This urging means may be in the form of a plurality of springs reacting against corresponding peripheral flanges on the rotatable member. Means may be provided for locking the sealing members to the rotatable member for rotation therewith.

By providing a large surface area of contact between the rotatable member and the conductive liquid a low potential drop across the connection is obtained, and this is of particular importance in an electrodeposition process where the electrolysing current may be in the region of 30,000 amps. Also, where the stationary member is arranged such as to provide a sealed space, then there is little risk of contamination of the conductive liquid, or escape of liquid vapour into the atmosphere.

DETAILED DESCRIPTION

Figure 1:
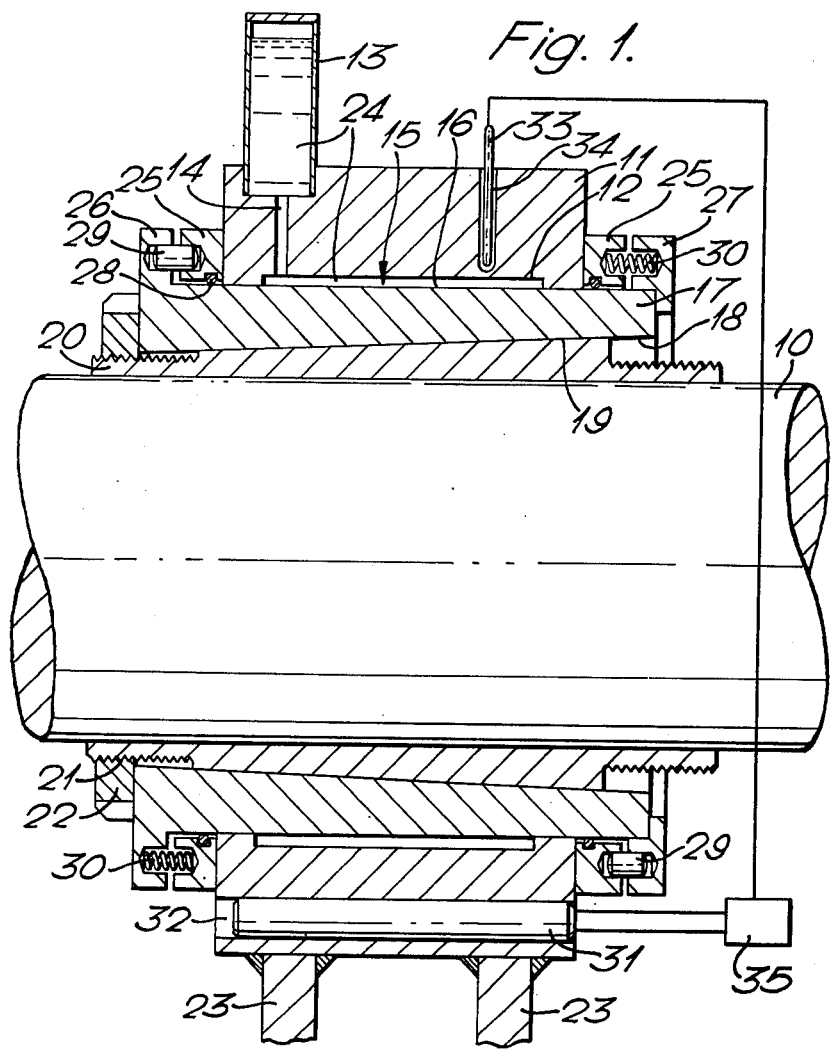
FIG. 1 is a longitudinal section through an electrical connection.

In FIG. 1 there is shown an electrical connection for introducing current into a cylindrical shaft 10 from a stationary member 11 in the form of an annulus encircling shaft 10. The internal surface of stationary member 11 has an annular recess 12 formed therein extending almost the full width of the stationary member 10. A conductive liquid reservoir 13 is mounted on the stationary member 11 at the top thereof and communicates via a passage 14 with an annular space 15 formed by the recess 12 and an associated external cylindrical surface 16 of an outer annular sleeve member 17 encircling shaft 10. The internal surface 18 of sleeve member 17 is tapered and mates with a corresponding tapered surface 19 of a split inner sleeve member 20 which is threaded at 21 so that rotation of nut 22 draws the inner sleeve member 20 into locking engagement with outer sleeve member 17 and shaft 10. The outer sleeve member 17, the inner sleeve member 20 and the shaft 10 thus rotate together and for the purposes of this invention are to be considered as a rotatable member.

External electrical connection to the stationary member 11 is obtained in a conventional manner, in this particular case by bus bars 23 welded to the stationary member 11.

The stationary member 11 is not designed for load bearing purposes, and for carrying the load which the shaft supports special-purpose bearings (not shown) are provided and which form no part of the electrical connection between shaft 10 and stationary member 11. For ease of construction and operation the stationary member 11 is not designed to fit so tightly onto the outer sleeve member 17 that there is no possibility of a leakage of a conductive liquid 24, and thus to provide a seal against the aforementioned leakage of conductive liquid an annular member 25 formed of a sealing material is provided adjacent each end face of the stationary member 11. A peripheral flange 26 is provided at one end of the outer sleeve member 17 at the other end of which is detachably mounted a corresponding flange member 27. Each of the annular members 25 has an annular groove formed in its internal cylindrical surface in which is mounted an O-ring 28 which seals against the cylindrical surface 16. To reduce wear on the O-rings 28, it is arranged for the annular members 25 to rotate with the shaft and sleeve members, and this is achieved by means of locking pegs 29 which engage in recesses in the annular members 25 and the flange 26 and flange member 27. Similarly engaged in corresponding recesses are a plurality of helical springs 30 which act to press the annular members 25 against the end faces of the stationary member 11. Conveniently the locking pegs 29 and the helical springs 30 are uniformly arranged around the annular members 25, alternating with each other.

The conductive liquid is a molten mixture of 31.25% lead, 18.75% tin and 50% bismuth, the percentages being by weight. The melting point of the molten mixture is in the region of 84.5°C and for maintaining a molten condition a plurality of electrical heaters 31 are mounted in longitudinal apertures 32 regularly disposed around the stationary member 11. The heaters are energized from an electrical power supply 35 which is responsive to the output of a thermo-couple 33 mounted in a radial passage 34, the bottom of which passage lies adjacent the recess 15.

It will be appreciated that the stationary member 11, the outer sleeve member 17, and the inner sleeve member 20 are all formed of a suitable conductive material so that a low resistance electrical connection can be made to the shaft 10. It will also be appreciated that the conductive liquid is preferably one which is not corrosive with respect to the material of the stationary member 11 or the outer sleeve member 17.

Figure 2:
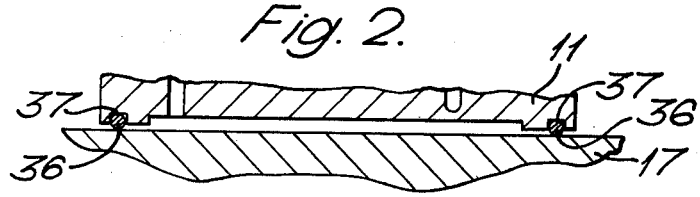
FIG. 2 is a longitudinal section through a part of an electrical connection having an alternative sealing arrangement.

FIG. 2 shows an alternative sealing arrangement in the form of O-rings 36 disposed in corresponding grooves 37 in the internal surface of stationary member 11.

The aforedescribed connection has a total potential drop from the shaft 10 to the bus bars 23 of the order of 5mV at a current density of 15 A/sq. cm. This is lower than can be achieved using conventional brush techniques.

We claim:

1. An electrical connection between a rotatable member having at least a portion thereof formed with a cylindrical surface, and a conductive stationary member having a surface complementary to at least a portion of said cylindrical surface and being arranged adjacent thereto, the rotatable member being in the form of a composite structure comprising an inner portion, an annular outer portion spaced from the inner portion, having a taper internal surface and being locked to the inner portion by means of an arrangement including a split taper sleeve disposed between the inner and outer portions, at least one of said complementary surface and said cylindrical surface having a recess therein such as to form a space between the stationary and rotatable members, the connection including a conductive liquid contained in the space, and sealing means arranged to prevent leakage of conductive liquid from the space, and wherein the stationary member has connector means for enabling an electrical connection to be made thereto.

2. A connection as recited in claim 1 wherein the conductive liquid is a combination of at least two of the elements tin, lead, bismuth, cadmium, tellurium, indium, arsenic, gallium and zinc, having a melting point above ambient temperature, and including heating means arranged to supply heat to the conductive liquid so that it stays in its liquid state.

3. A connection as recited in claim 2 wherein the conductive liquid is 31.25% lead, 18.75% tin and 50% bismuth, percentages being by weight.

4. A connection as recited in claim 2 wherein the stationary member has a plurality of regularly distributed aperture means therearound, and wherein the heating means comprises a respective electrical heating means mounted in each of the aperture means.

5. A connection as recited in claim 2 including a temperature sensing means arranged such that the sensing point of the temperature sensing means is adjacent the space containing the conductive liquid, and wherein the heating means is arranged to be responsive to the output of the temperature sensing means such as to maintain the conductive liquid at or near a preselected temperature.

6. A connection as recited in claim 1 wherein the sealing means is in the form of resilient sealing members disposed within respective grooves in the complementary surface of the stationary member and engaging the rotatable member.

7. A connection as recited in claim 1 wherein the stationary member has flat end faces and the sealing means is in the form of an annular sealing member for each of the end faces, each sealing member being arranged to seal against its associated end face and also to the cylindrical surface of the rotatable member, and including means for urging each sealing member toward its associated end face.

8. A connection as recited in claim 7 wherein at least one of the seals against the associated end face and against the rotatable member includes an O-ring disposed in a corresponding groove in the annular sealing member.

9. A connection as recited in claim 7 wherein the rotatable member has a peripheral flange associated with each of the end faces of the stationary member, and the urging means comprises a plurality of springs compressed between the peripheral flanges and the sealing members.

10. A connection as recited in claim 7 and including means arranged to lock the sealing members to the rotatable member for rotation therewith.

11. An electrical connection between a rotatable cylindrical shaft and a stationary member, comprising an outer sleeve encircling the shaft and having a cylindrical outer surface and a taper inner surface, a split inner sleeve disposed between the outer sleeve and the shaft and having a cylindrical inner surface and a taper outer surface, means for forcing the inner sleeve into locking engagement with the outer sleeve and the shaft, the stationary member having connector means for enabling an electrical connection to be made thereto and having an inner surface complementary to the cylindrical outer surface of the outer sleeve, the complementary inner surface having an annular recess therein so as to form an annular chamber between the stationary member and the outer sleeve, conductive liquid reservoir means mounted on the stationary member and communicating with the recess in the complementary surface of the stationary member such as to maintain the annular chamber full with conductive liquid, and sealing means arranged to prevent leakage of conductive liquid from the annular chamber.

12. A connection as recited in claim 11 wherein the sealing means comprises an annular sealing member for each axial end face of the stationary member, the sealing members being arranged to seal against the stationary member end faces and also against the outer cylindrical surface of the outer sleeve and being locked to the outer sleeve for rotation therewith.

13. A connection as recited in claim 11 wherein the conductive liquid is one requiring to be kept at an elevated temperature and including temperature sensing means arranged adjacent the recess in the stationary member and heating means for heating the stationary member in response to an output from the temperature sensing means such as to maintain the sensed temperature at a preselected value.

14. A connection as recited in claim 11 wherein the sealing means comprises resilient sealing members disposed in respective grooves in the complementary surface of the stationary member and engaging the outer cylindrical surface of the outer sleeve.

* * * * *